(12) United States Patent
Wilke

(10) Patent No.: US 8,845,302 B2
(45) Date of Patent: Sep. 30, 2014

(54) METHOD FOR CONTROLLING GROUND MEAT FLOW RATES

(75) Inventor: Daniel B. Wilke, Waunakee, WI (US)

(73) Assignee: Kraft Foods Group Brands LLC, Northfield, IL (US)

( * ) Notice: Subject to any disclaimer, the term of this patent is extended or adjusted under 35 U.S.C. 154(b) by 61 days.

(21) Appl. No.: 13/438,550

(22) Filed: Apr. 3, 2012

(65) Prior Publication Data
US 2012/0189759 A1    Jul. 26, 2012

Related U.S. Application Data

(63) Continuation of application No. 12/046,970, filed on Mar. 12, 2008, now Pat. No. 8,172,545, which is a continuation-in-part of application No. 11/061,716, filed on Feb. 18, 2005, now Pat. No. 7,488,502, which is a continuation-in-part of application No. 10/644,624, filed on Aug. 20, 2003, now Pat. No. 7,169,421.

(51) Int. Cl.
*F04B 49/06* (2006.01)
*F04B 49/20* (2006.01)
*A22C 5/00* (2006.01)

(52) U.S. Cl.
CPC .......... *F04B 49/065* (2013.01); *F04B 2205/09* (2013.01); *F04B 49/20* (2013.01); *A22C 5/00* (2013.01)

USPC ............................................... 417/43

(58) Field of Classification Search
CPC ............................. F04B 2205/09; F04B 49/20
USPC ............................................ 417/43; 426/646
See application file for complete search history.

(56) References Cited

U.S. PATENT DOCUMENTS

2003/0124221 A1 * 7/2003 Garwood ................ 426/35
2007/0154320 A1 * 7/2007 Stiles et al. ............. 417/43

* cited by examiner

*Primary Examiner* — Bryan Lettman
(74) *Attorney, Agent, or Firm* — Fitch, Even, Tabin & Flannery LLP

(57) ABSTRACT

A method for continuously controlling the flow rate of a meat input stream for making a meat product is disclosed. A flow rate algorithm is provided that depends upon pump speed (RPM) for control of the flow rate. A correction factor provides further control of the system and is dependant upon loss in weight data when meat is not being added. When meat is being added and a new target flow rate is desired, a modified correction factor is calculated based upon a previous error factor and a new initial pump speed based on the new target flow rate. The modified correction factor is used to obtain an adjusted pump speed. The RPM of the pump motor is used as the main control of the flow rate, and the loss in weight data fine tunes this RPM parameter for finer control to better achieve a target flow rate.

7 Claims, 2 Drawing Sheets

METHOD FOR CONTROLLING GROUND MEAT FLOW RATES

CROSS REFERENCE TO RELATED APPLICATION

This application is a continuation of U.S. patent application Ser. No. 12/046,970, filed on Mar. 12, 2008, which is a continuation-in-part of U.S. patent application Ser. No. 11/061,716, filed on Feb. 18, 2005 and issued as U.S. Pat. No. 7,488,502 on Feb. 10, 2009, which is a continuation-in-part of U.S. patent application Ser. No. 10/644,624, filed on Aug. 20, 2003 and issued as U.S. Pat. No. 7,169,421 on Jan. 30, 2007, all of Which are hereby incorporated by reference in their entirety.

FIELD

A method of control for processing meat and, in particular, a method for measuring and controlling flow rates of ground meat as it is being added to and blended with other input streams to yield a processed meat product.

BACKGROUND

In the manufacture and production of processed meat food products, the final amount of ground meat components in the final food product is labeled, such as the percent fat and/or amount of protein, for example. The amount of ground meat added to the process is used to calculate the amounts of other additional ingredients that are based on the amount of meat added. Therefore, there is a need to measure the amount of ground meat transported into the process hopper from the meat hopper and added to other ingredients. One way to measure the amount of ground meat is to monitor the flow rate of the system. However, flow rates of non-liquid streams, such as ground meat, can be difficult to measure in a continuous process.

One method of measure utilizes a proportional-integral-derivative controller, or PID loop control, often used as a feedback loop control in process manufacturing systems. The PID controller obtains a measured value from the process and compares it with a setpoint or target value. The difference between the two values, if any, is an error value, which is then used to calculate a correction to the process input variable so that the correction will remove the error from the process output measurement and bring it closer to the target setpoint.

In a ground meat processing system, loss in weight data is measured to provide PID loop control to establish the flow rate of ground meat. Loss in weight data is obtained by measuring the weight of the ground meat stream fed to the system (i.e., fed to the pump) and subtracting the final weight of the stream at the same location after a set time period has elapsed. When considered in conjunction with the elapsed time, this yields an actual flow rate which can be used to obtain a difference in flow rate between the actual flow rate value and the target value, which is an error value. The pump speed is then adjusted based on the loss in weight data provided to the PID loop control.

One problem with the PID loop control being based on loss in weight data, however, is that as the hopper is being filled with the meat, the loss in weight data cannot be properly calculated, as can be seen in FIG. 2. This is because meat is being added to the hopper at the same time that meat is leaving the hopper and being transported through the pump, therefore, an accurate measurement of weight loss cannot be properly measured at the same time. As a result, during times of filling the hopper flow rate measurements must be temporarily halted due to the rapid increase in weight within the hopper. Therefore, the halt in collecting loss in weight data interferes with the operation of the PID loop control and during these periods of filling there is no PID loop control.

Without accurate and continual PID loop control, or any other type of flow rate control of the system, inaccurate flows of the meat stream may cause the amount or weight of meat added to the final meat product to be inaccurately calculated.

SUMMARY

A self-correcting algorithm provides control over the flow rate of meat during filling of a pump hopper while meat is exiting the hopper. The flow rate is controlled by using the self-correcting algorithm based upon the speed of the pump, such that a desired target flow rate is chosen and used to calculate the necessary pump speed for obtaining that flow rate. Additionally, the control of the flow rate can be fine-tuned by applying a bias correction factor that is based upon loss in weight data of the meat when the hopper is not being filled.

The self-correcting algorithm can be based upon the equation of a line, where 'm' is a known, calculated constant, i.e., the slope, and 'b' is a changing constant that is the bias correction factor. When the hopper is being filled, the bias correction factor is not calculated and the flow rate is at that time controlled by the pump speed. During filling, a target value for the flow rate is inserted into the equation of the algorithm and divided by the slope, m. The result is the speed of the pump required to obtain the target flow rate. The pump is then adjusted to this calculated pump speed and allowed to run until another different flow rate is desired.

If the pump hopper is not being filled, then the bias correction factor can be employed. The bias correction factor relies on the error value of the flow rates, which is based upon the difference between an actual flow rate and the target flow rate. Since the actual flow rate of ground meat cannot be easily measured, it may be calculated using loss in weight data. Loss in weight data can be calculated by weighing the initial amount of ground meat in the hopper prior to entering the pump and weighing the final amount of ground meat at the same location after a set period of time has elapsed. The difference of the weights divided by the time period elapsed becomes the actual flow rate. The bias correction factor is then obtained by calculating a flow error, or difference between the target flow rate and the actual flow rate, and dividing the flow error by the target flow rate and multiplying by the current pump speed. To obtain a new, adjusted pump speed, the bias correction factor is added to the current pump speed. This new, adjusted pump speed is the new setting for the pump to bring it closer to the target flow rate.

This correction factor is calculated for the duration of the process as long as the hopper is not being filled with ground meat. Once filling begins, the last calculated pump speed, using the previously calculated bias correction factor, is used for the duration of the hopper filling. If during this time the target flow rate is changed, then the self-correcting algorithm based on the pump flow rate and slope can be used to adjust the speed.

DETAILED DESCRIPTION

Figure 1:
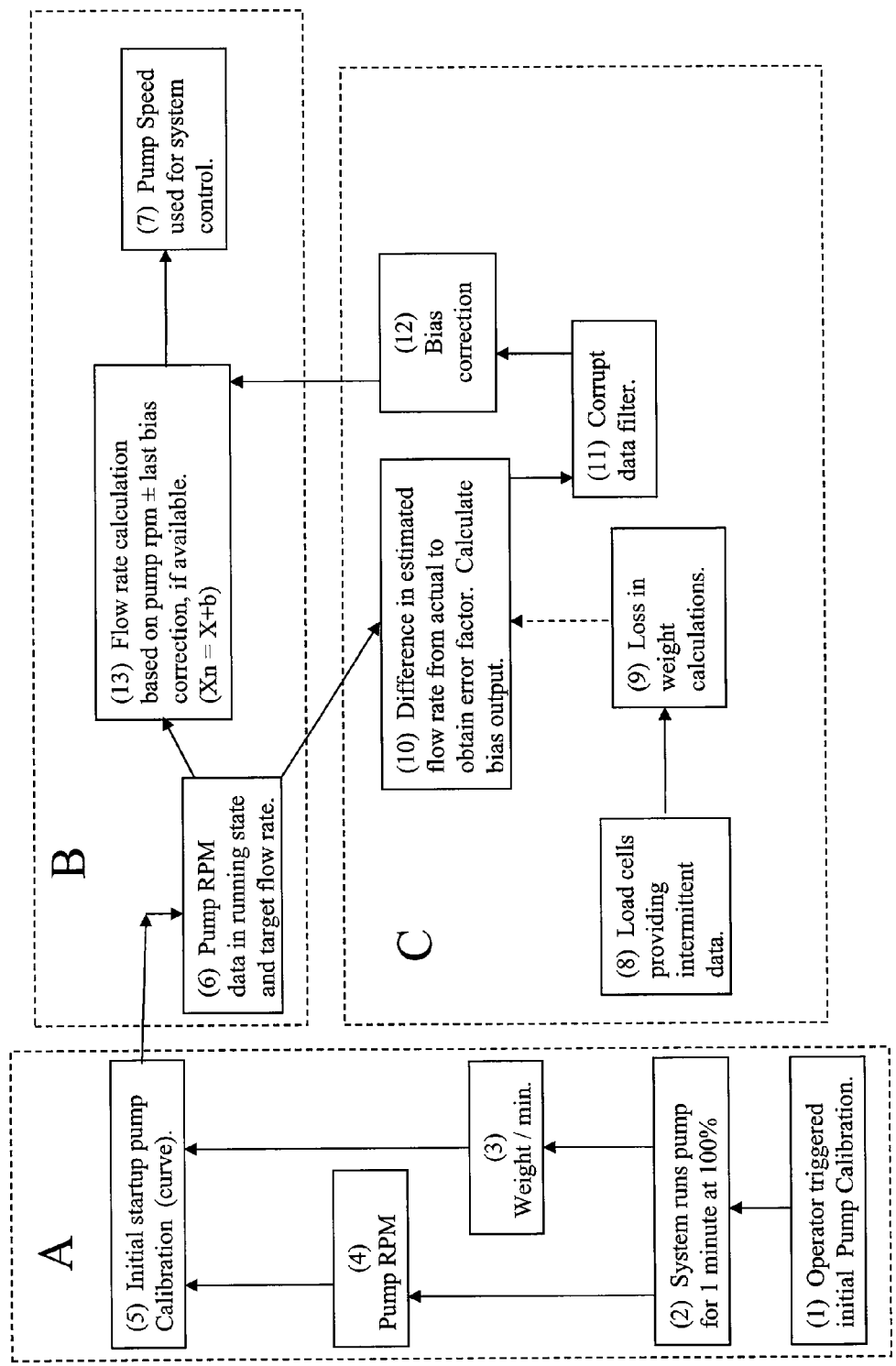
FIG. 1 is a flow diagram of the control process provided for controlling ground meat flow rates.

A method is provided for controlling a flow rate of streams of ground meat, and more particularly, controlling the flow rate of ground meat by applying a self-correcting algorithm that uses a pump speed to provide continuous control. The algorithm is based on the equation of a line and uses loss in weight data to build an error of prediction into the equation. An initial algorithm, or base equation, is obtained by running a pump through which the ground meat passes for a set time interval and at a set speed, and measuring the weight of the ground meat at the beginning and the weight of the ground meat at the end of the set time interval. This gives the initial base equation. When the pump is not being filled with ground meat, loss in weight data may be obtained for a more precise measure of actual flow rate, thus providing a bias correction factor that helps to determine a new, adjusted pump speed. This method can be applied to the systems disclosed in U.S. Patent Publication Application No. 2005-0255223, which is hereby incorporated by reference in its entirety.

An input stream of ground meat is provided to a system that manufactures food products containing ground meat, where a relatively precise measurement of the amount of ground meat added to the system needs to be provided. This can be done by measuring and controlling the flow rate of the ground meat stream through use of a self-correcting pump algorithm. Typical process lines may comprise a ground meat receiver, or hopper, where the ground meat is first introduced into the system, and a pump downstream of the hopper, which transports the ground meat to be mixed with other additional ingredients in the system, such as in a main process hopper, to make up the final food product. To measure and control the flow rate of the ground meat stream, an initial base flow rate equation can be calculated from an initial test run, or calibration run, which in turn provides a final algorithm.

The base flow rate equation may be obtained from using the equation of a line, $Y=mX+b$, and by setting the pump speed (RPM) to a chosen value, $X_b$, or a base pump speed, for a set time period, $T_b$, or base time, allowing the pump to run and to transport ground meat for that set time period. A typical set time period may be for about one minute. During that time an initial weight, $W_I$, is obtained for the ground meat prior to entering the pump and a final weight, $W_F$, after the set time period has elapsed at the same location. The difference of the two weights is obtained, $W_I-W_F$, as the weight difference, W.

In order to calculate the base flow rate, $Y_b$, at the given base pump speed, $X_b$, the difference in weight, W, can be divided by the set time period, $T_b$, or $$Y_b = \frac{W}{T_b}.$$

The predetermined pump speed and the calculated flow rate, $Y_b$, are then inserted into the equation of the line $Y=mX+b$, where b is set to equal zero, and the equation is solved for m. The variable m is the slope of the line. Solving for the slope, the equation becomes, $m=Y/X$, where Y is a flow rate value and X is a pump speed value. Therefore, using the parameters from the initial test run, the base equation of the slope becomes $m=Y_b/X_b$, and hence m becomes a known value that is constant. This constant value for m may be used until the next calibration test run is performed at a set speed and time.

Alternatively, a new m value can be recalculated each new day of use, or at other suitable intervals. For example, a calibration run can be made, whether at initial start-up or at subsequent recalibration runs, where the base pump speed is randomly set at 2000 RPM during the calibration run, and allowed to run for one minute, while the weight of the ground meat at the beginning and at the end of one minute is measured. During this calibration run, 400 lbs ($W_I$) were added to the hopper at time zero and 200 lbs ($W_F$) remained after 1 minute which yielded a weight difference of $W_I-W_F=W$ or 400 lbs−200 lbs=200 lbs. To obtain the base flow rate $Y_b$, the weight difference W, or 200 lbs, is divided by the time elapsed, $T_b$, or 1 min., such that $Y_b=W/T_b$ or $$\frac{200 \text{ lbs}}{1 \text{ min}}$$

resulting in 200 lbs/min. Then, if $Y_b$ is 200 lbs/min and $X_b$ is 2000 RPM, the slope of the line, when b=0 is $m=Y_b/X_b=200/2000$ or 0.1.

Subsequently, the pump algorithm may be obtained with b initially set to equal zero, or $Y=mX$, such as is done when the pump hopper is being filled, where m is now a known constant and equals $Y_b/X_b$ (i.e., therefore substituting for m, the equation of the algorithm becomes $Y=Y_b/X_b X$).

Using the pump algorithm $Y=mX+b$, with b=0, an initial pump speed can be obtained by inserting a desired flow rate, or target value, $Y_T$, into the equation such that the pump speed value, X, equals $Y_T/m=X$, where m is known and equals $Y_b/X_b$. This equation, therefore, yields the speed at which to set the pump in order to achieve the desired flow rate. For example, if m=0.1 (i.e., solved previously during the test run) and b=0, the pump algorithm becomes $Y=(0.1)\times X$, and in solving the equation for X, further becomes $X=Y/(0.1)$. If a desired flow rate, or $Y_T$, of 100 pounds/minute ground meat is desired, that value is used in the equation to provide the X, or speed, at which to set the pump. In this example, the speed provided would be 1000 RPM, or the result of 100/0.1, and therefore the pump could be set to this initial speed to result in the predicted target flow rate of 100 lbs/min ground meat.

However, the pump speed can be further fine-tuned by adding in the correction factor, b, which is dependent upon having a continuous weight reading and not setting the correction factor to equal zero. The correction factor can be used when a continuous weight value can be generated, which is typically when the hopper is not being filled. This continuous weight value can be obtained by use of a load cell, for example, or other weight measuring device, placed underneath the pump and hopper to continuously measure and provide weight loss data over time. It is this loss in weight data that can then be used to provide an actual flow rate, $Y_a$ (i.e., the difference in weight loss is calculated and divided by the time elapsed).

The difference between the target value for the flow rate and the actual flow rate is the flow rate error, $Y_e$, which is equal to $Y_T-Y_a$, and is used in calculating the bias correction factor, b. The bias correction factor, b, is calculated by multiplying an error factor, E, by the current pump speed, or $b=E\times X$, where $$E = \frac{Y_e}{Y_T}.$$

The bias correction factor value obtained is then added to the current pump speed, X, to obtain a new, corrected pump speed, $X_n$ (i.e., $X_n=X+b$). The pump setting in the system is then adjusted to this new setting, $X_n$, and should provide a flow rate that is closer to the desired flow rate value.

For example, if the initial pump speed is set to 1000 RPM to achieve a predicted flow rate of 100 lbs/min ground meat, $Y_T$, as in the previous example above, but instead the pump setting actually achieves a lower flow rate of only 90 lbs/min, $Y_a$, the pump speed can then be adjusted to better target the desired flow rate value. The adjustment is made by using the bias correction factor and error factor to determine the new pump speed setting. To calculate the bias correction factor, the error factor is first calculated, which is obtained by dividing the flow rate error by the target flow rate. The flow rate error is the difference between the target flow rate and the actual flow rate, which is 100 lbs/min−90 lbs/min, or 10 lbs/min. That value is then divided by the target flow rate to obtain the error factor such that $$E = \frac{10 \text{ lbs/min}}{100 \text{ lbs/min}} = 0.1.$$

To obtain the bias correction factor, the error factor is then multiplied by the current speed, so that $b=0.1\times1000$ RPM or $b=100$ RPM. Then the correction factor is added to the current speed to obtain a new speed setting, such that $X_n=X+b$, or $X_n=1000$ RPM+100 RPM and thus $X_n=1100$ RPM as the new pump setting. The pump is then adjusted to this new speed setting and the actual flow rate yielded by the new speed, $X_n$, is measured and the whole process can be repeated again to obtain still finer control where the target flow rate has still not yet been reached. The entire calculation can be repeated as long as the pump hopper is not being filled, to continually adjust the pump speed until the flow rate error is zero. The adjustment of the speed can continue to compensate for changes in the product and/or pumping efficiency. Typically, a change in the product (i.e., meat source) can also change the pumping efficiency.

When the pump hoppers are being filled, the load cell data reading or weight reading may be shut off due to erratic changes in the weight of the meat during the addition of more ground meat to the system as a reduction in the weight occurs simultaneously. During filling, the bias correction factor cannot be updated because there is no accurate weight loss data being input to the system. However, while the system is filling, the remaining ground meat already in the system will continue to be pumped through the pump at the last adjusted pump speed based on the last calculated bias correction factor. For example, in the previous example above, the new, adjusted speed became 1100 RPM based on a correction factor of b=100 RPM, and an error factor of 0.1. Therefore, during filling the pump speed would remain at 1100 RPM, as calculated prior to filling and using the most recent b, as long as the target flow rate value remains the same.

If during this time (i.e., during filling of the hoppers) the flow rate needs to be adjusted to a different target flow rate, the pump algorithm can be used to obtain an initial pump speed, which can then be corrected based upon the last error factor, E, that was calculated. The initial pump speed can be calculated from Y=mX, with b set to equal zero, m equal to the previously calculated constant and Y equal to the new target value. The error factor, E, can be assumed to be the same while the pump hopper is being filled and can therefore be plugged into the equation for the bias correction factor using the previous error factor, E, and the newly calculated initial pump speed, $X_i$.

The error factor, E, represents the error between an actual flow rate and a target flow rate calculated while the pump was operating during a break in filling. This difference between the target and actual flow rates shifts the location of the pump speed line, as represented by the pump algorithm, to correct for this variation between actual and target flow values. When the pump hopper is being filled, it can likewise be presumed that the variability of the pump will be the same as during the break in filling and that the actual flow rate will similarly vary from its new target value by the same error factor, E. Therefore, by utilizing the previously calculated error factor, E, the line representing the pump algorithm can be prematurely offset by this amount (i.e., E) in order to pre-correct for the known variability of the pump speed. Therefore, an automatic correction can be made when a new flow rate value is targeted during filling of the hopper and when an actual bias correction factor cannot be measured. An assumption can be made that the pump algorithm line will be shifted per the previously calculated error factor and as a result, a modified bias correction factor, $b_m$, can be based on the previous error factor and the new initial pump speed, $X_i$, such that $b_m=E\times X_i$. Thus, the final pump speed for the system then becomes $X=X_i+b_m$.

For example, during filling, if a new flow rate is targeted, the pump algorithm can be used to calculate an initial pump speed, $X_i$, by setting b=0 and solving for $X_i$, using the previously calculated constant m. For example, if a new flow rate of 80 lbs/min is being targeted during filling, rather than the previous target of 100 lbs/min, then a new initial pump speed is needed. To calculate the initial pump speed, the bias correction factor, b, can be set to equal zero and the pump equation becomes Y=mX. The previously calculated slope, constant m, is used with the new target flow rate to calculate the new initial pump speed, $X_i$. Plugging in the values into the equation yields the following:

$$Y = mX_i,$$

$$X_i = \frac{Y}{m} = \frac{80 \text{ lbs/min}}{0.1} = 800 \text{ RPM},$$

where the new initial pump speed setting equals 800 RPM.

However, the initial pump speed does not become the new pump setting, rather a modified bias correction factor is calculated based upon the previously obtained error factor, E, and is used to obtain the pump setting. The modified bias correction factor is then added to the initial pump speed to obtain a new pump setting. For example, the previously calculated error factor, E, was equal to 0.1. The modified bias correction factor, $b_m$, can then be calculated from the equation $b_m=E\times X_i$ or $b_m=0.1\times800$ RPM=80 RPM, yielding a modified bias correction factor of 80 RPM. Therefore, the new pump setting is $X_n=X_i+b_m=800$ RPM+80 RPM which is 880 RPM and the pump speed is initially set to 880 RPM during filling to yield the new target flow rate of 80 lbs/min.

Controlling the system using the previously calculated error factor and an initial pump speed calculated per the pump algorithm, rather than loss in weight data, allows for control of the system continuously via pump speed, even during filling of the hopper. This allows the system flow to still be corrected even though the hopper is being filled.

Turning to FIG. 1, a flow diagram is illustrated that depicts the various steps of the process. At box A, the initial start up of the pump and calibration is shown, which yields the constant value, m, for the pump equation. At step 1 the pump is set at a chosen speed and allowed to run while transferring ground meat through the system. Step 2 allows the pump to run for one minute. Step 3 determines the weight difference of the ground meat during that minute of pump time, such that an initial weight of meat prior to entering the pump is measured and a final weight of ground meat prior to entering the pump (i.e., in the same location) is measured and the difference is calculated and divided by one minute to obtain a flow rate. At step 4 the pump RPM value is inserted into the initial base equation at step 5 along with the flow rate (from step 3) and the constant slope value, m, is calculated from the equation of a line, Y=mX+b, setting b=0, and solving for m.

At box B, the real time control of the flow rate is illustrated, after the initial start up and calibration. Step 6 provides a pump speed at which to run the pump to obtain a desired, set flow rate. The pump RPM at step 6 is determined by using the pump equation with m, a known constant, from step 5, and b set to equal zero. The equation is solved for X, X=Y/m, where both X and Y are unknown. A desired target Y value is determined and plugged into the equation and an X value is obtained. The pump is then set to this setting at step 6 and allowed to run at that speed until a bias correction factor is obtained to correct for an actual flow rate that is different.

At box C, the bias correction factor is actually calculated and introduced into the flow rate equation during breaks in filling the hopper. Step 8 obtains a load cell data reading of the weight of the ground meat, the load cell being positioned beneath the pump and hopper. The data from the load cell is continuously provided during breaks from filling, but is turned off during filling, hence providing intermittent data during running of the system as a whole. While the load cell is reading weight data from the hopper and pump, this weight information is being used to calculate the loss in weight, at step 9, for a set time period of operation, which then uses the loss in weight data to provide the actual flow rate value. The target flow rate provided at step 6 is compared at step 10 to the actual flow rate calculated from step 9, where the difference between the two, if any, is then used to calculate the bias correction factor, as previously described.

At step 11, the bias correction factor can pass through a corrupt data filter, which filters out error data that is either very high or very low, or at least about a +/−10% difference. If the data varies at 10% or more in either a positive or negative direction, then that value is discarded as possibly corrupt data that is most likely caused by an aberrant spike or peak in the system and no correction factor is provided to the system. If the data has less than a 10% variance in either the positive or negative direction, then the data is allowed to pass through the filter and is provided as the bias correction factor, b, at step 12. The bias correction factor is provided to the flow rate equation and is added to the current pump speed, at step 13, to result in the new pump speed, at step 7, at which to adjust the pump in order to better achieve the desired target flow rate. Additionally, during filling of the hopper where the same target flow rate is desired, the previously obtained speed at step 7 remains constant during the filling without making further corrections to it.

If, however, the pump hopper is being filled and a new flow rate is desired, then the load cells, at step 8, will not be used to provide weight loss data. This in turn means that the loss in weight calculation at step 9 cannot occur and an actual flow rate is no longer available, which is illustrated by the dashed arrow to step 10 indicating that information is not transmitted under these conditions. As a result, the previously calculated error factor at step 10 is used with the speed which would theoretically yield the desired flow rate if there was no variability. These two values can be used to calculate a modified bias correction factor, which can also pass through the data filter at step 11 and then be provided as the bias correction factor at step 12 to the new pump speed equation ($X_n=X+b$) at step 13 where $X=X_i$, where $X_i$ is the new initial pump speed, to yield a corrected pump speed at step 7. Once the filling is completed then the actual flow rate and subsequently the actual error factor can be calculated and provided at step 10.

Figure 2:
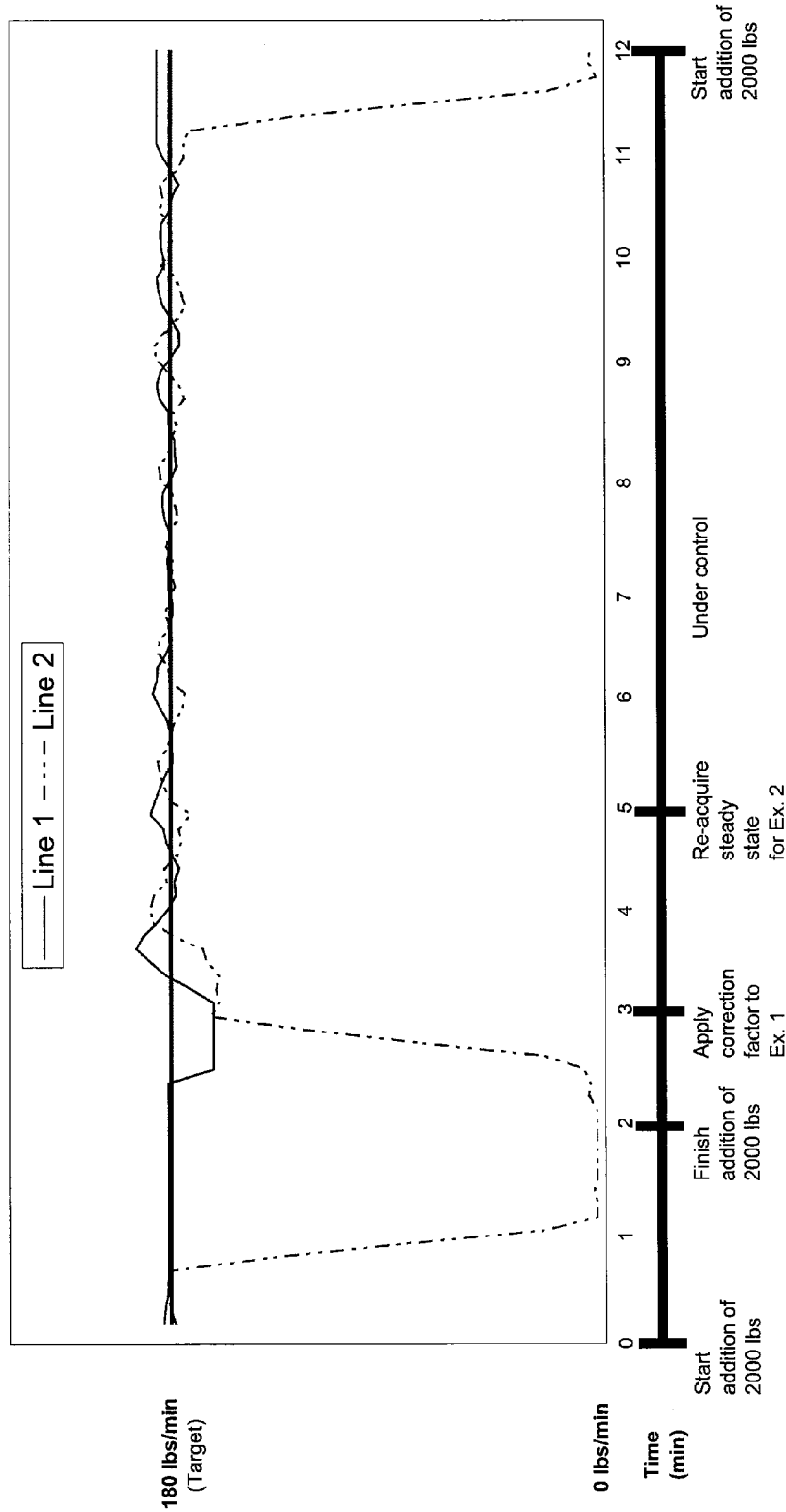
FIG. 2 is a graphical representation of pump speed over time for a control process utilizing a prior art control system.

FIG. 2 depicts a prior art control system, which provided for process control via a PID control system based on loss in weight data only. Line 1 comprises the pump control line (i.e., the pump RPM) and line 2 comprises the PID control line or loss in weight data. In FIG. 2 a meat product was desired where the meat flow rate target was 180 lbs/min with a total start weight of 2000 lbs of meat. The initial quantity of meat was added at time zero for approximately two minutes, thus at the end of two minutes the pump hopper had been filled and addition of meat was complete. The hopper remained full of meat for approximately 10 minutes, at the end of which addition of meat was started again. During this time (i.e., filling of the hopper, emptying, and filling again), the pump was constantly operating to transport meat through the system.

FIG. 2 utilized a control system based upon loss in weight parameters, and as a result it could not control the system or operate during times of filling. After addition of the meat was completed at about the two minute mark, then the control system of FIG. 2 could finally begin controlling its process flows via the loss in weight parameters. After about six minutes, the process control used in FIG. 2 had slowly begun to reacquire steady state and was relatively under control by about the seven minute mark. By about twelve minutes, the system was ready to be refilled with meat again.

In FIG. 2, when the pump system and/or hopper was being filled with meat the loss in weight PID control, line 2, dropped to zero. This was because the loss in weight data could not be measured during filling of the system since erratic weight values would be obtained due to the meat being both pumped out and replenished simultaneously. As a result, the system was no longer controlled via the PID control and the pump control, line 1, remained set at a constant value, i.e., the previous pump setting, which resulted in a flow rate below the target value. The pump speed (RPM) was set at the constant value until the filling of meat was completed and the loss in weight data could be measured again and provide control.

Even after the loss in weight data began controlling the system, the amount of time it took for the pump speed, line 1, to reacquire a steady state was great, as can be seen by the variability of line 1 immediately after start-up of the loss in weight PID control, line 2, after about the two minute point. The pump control, line 1, did not reacquire steady state control until about 4-5 minutes after the PID control loop started up again.

In contrast, the control system disclosed herein comprising the self-correcting algorithm can operate at all times and can correct and control flow rates even during filling of the hopper or pump system. The self-correcting algorithm not only provides a means to control the pump during times of filling (i.e., when adding meat to the system), but it also reacquires steady state control much faster once the loss in weight parameters are measured again, typically within seconds rather than minutes with the prior art control system. Unlike prior PID control systems, the self-correcting algorithm can actually change flow rates during filling of the hopper, whereas the PID control system could not and was essentially locked into a pump speed RPM during filling.

The self-correcting algorithm provides control to the process based on pump speed and fine tunes the process based upon loss in weight data or previously calculated error factors if the system is filling. Where the hopper is no longer being filled the correction factor based on loss in weight data becomes available and can be applied to the algorithm to obtain a finer control of the system when needed. At all times of the process operation utilizing the self-correcting algorithm, including during filling, the flow rate can be controlled, unlike during the process operation of FIG. 2. Thus, the self-correcting algorithm disclosed herein provides an output flow rate that better approximates the target flow rate desired.

From the foregoing it will be appreciated that a method for controlling ground meat flow rates is provided. However, the disclosure is not limited to the aspects and embodiments described hereinabove, or to any particular embodiments. Various modifications to the method of controlling ground meat flow rates can result in substantially the same features.

What is claimed is:

1. A method of controlling a flow rate of a ground meat stream in making processed meat products comprising:
   pumping the meat stream from a hopper upstream of a pump at a first pump speed determined by a constant value and a first target flow rate value;
   measuring an actual flow rate of the meat stream to obtain a flow error value;
   calculating an error factor based upon the flow error value and the first target flow rate value;
   calculating a bias correction factor based upon the error factor and the first pump speed when there is a break in filling the hopper; and
   obtaining a second pump speed from applying the bias correction factor to the first pump speed.

2. The method of claim 1, wherein during filling of the hopper and while targeting the first target flow rate, the pump speed remains at either the first or the second pump speed.

3. The method of claim 2, wherein during filling of the hopper at a second target flow rate setting, a modified bias correction factor is obtained, the modified bias correction factor being based upon the error factor obtained during the break in filling and a newly calculated pump speed.

4. The method of claim 3, wherein the newly calculated pump speed is obtained from the second target flow rate and the constant value.

5. The method of claim 4, wherein a new adjusted pump speed is obtained based upon the newly calculated pump speed and the modified bias correction factor.

6. The method of claim 1 measuring the actual flow rate of the meat stream comprises weighing meat in the hopper before and after pumping the meat stream to the pump to determine a weight difference at the first pump speed.

7. The method of claim 1 wherein calculating the bias correction factor comprises passing the bias correction factor through a corrupt data filter to remove excessively high and/or low data peaks in the flow error value.

\* \* \* \* \*

UNITED STATES PATENT AND TRADEMARK OFFICE
CERTIFICATE OF CORRECTION

PATENT NO. : 8,845,302 B2  
APPLICATION NO. : 13/438550  
DATED : September 30, 2014  
INVENTOR(S) : Daniel B. Wilke Page 1 of 1

It is certified that error appears in the above-identified patent and that said Letters Patent is hereby corrected as shown below:

In the Specification

Column 1, Line 14; delete "Which" and insert -- which --, therefor.

Signed and Sealed this  
Fifth Day of May, 2015

Michelle K. Lee  
*Director of the United States Patent and Trademark Office*